Dec. 30, 1958 W. R. KELL 2,866,491
TIRE CHAIN CROSS LINK
Filed Sept. 6, 1955 2 Sheets-Sheet 1

INVENTOR.
Waldo R. Kell
BY
ATTORNEY.

Dec. 30, 1958 W. R. KELL 2,866,491
TIRE CHAIN CROSS LINK
Filed Sept. 6, 1955 2 Sheets-Sheet 2
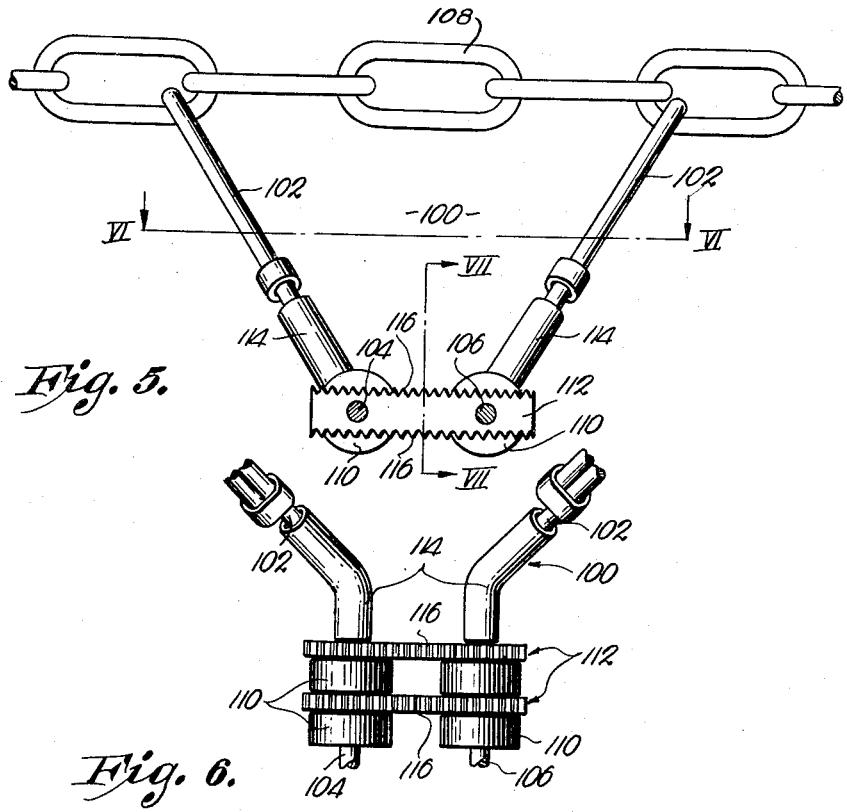
Fig. 5.
Fig. 6.
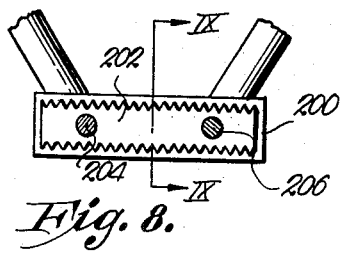
Fig. 8.
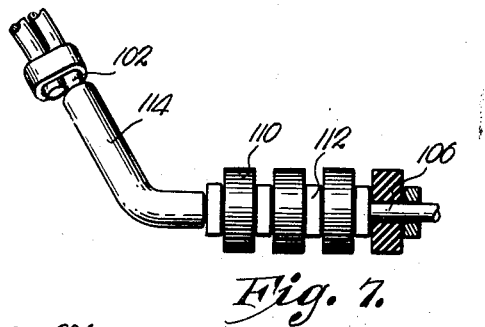
Fig. 7.
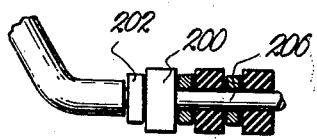
Fig. 9.
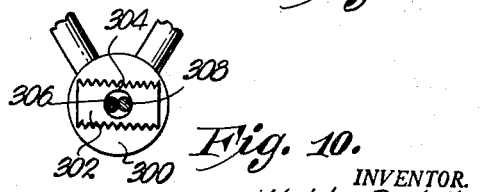
Fig. 10.
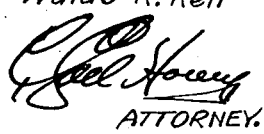
INVENTOR.
Waldo R. Kell
BY
ATTORNEY.

United States Patent Office 2,866,491
Patented Dec. 30, 1958

2,866,491

TIRE CHAIN CROSS LINK

Waldo R. Kell, Kansas City, Mo.

Application September 6, 1955, Serial No. 532,671

9 Claims. (Cl. 152—230)

This invention relates to improvements in automotive accessories and particularly to an anti-skid device for tires, the primary object being to provide a traction grip adapted to be attached to the tire transversely of the tread thereof and having novel means for minimizing skidding, eliminating noise and reducing wear.

It is the most important object of the instant invention to provide a traction grip having lugs of differing characteristics, formed and arranged to cooperate in a unique manner in attaining all the advantageous results desired in appliances of such nature.

Another important object of the present invention is to combine in a traction grip for an antiskid device, a plurality of lugs that are compressible between the tire and the roadbed with a number of relatively noncompressible metallic lugs which operate to provide necessary traction, particularly during starting and stopping.

It is an extremely important aim of this invention to provide a cross link that will not only present sufficient traction during normal driving conditions, but which will automatically increase its road and tire gripping functions upon presentation of a special need for better traction such as during starts and stops.

Important features of the cross element forming the subject matter of the instant invention, include substantially noiseless operation in conjunction with long wear, even on dry, hard roadbeds, while at the same time affording anti-skid characteristics which are increased immediately whenever the torque of the wheel is such as to compress the roller lugs and thereby bring into effect the more positive gripping action of the metallic lugs associated therewith.

A further object of the instant invention is the provision of a traction grip wherein the aforementioned lugs are mounted on a continuous axle which of itself, is resilient and flexible to conform to the contour of the tire tread and to imperfections in the roadbed, to not only preserve the life of the device but to render the same more fully effective for its intended purpose.

A still further and important object is to provide a support for the traction lugs that is substantially U-shaped, presenting relatively converging legs extending laterally from the axle having loops to permit a relatively simple means of mounting therefor.

An additional object of this invention is the provision of an anti-skid device having both metallic and compressible lugs, so arranged, mounted, disposed and shaped as to cause the compressible lugs to protect the metallic lugs against damage and undue wear during use.

Still another feature of the cross link about to be described is the provision of relatively rigid means such as tubular elements at the juncture between the legs and the axle for preventing flexure between the legs and the axle and to protect the same against damage during use.

Other objects include many important details of construction to be made clear as the following specification progresses, reference being had to the accompanying drawings wherein:

Fig. 5 is a transverse, cross-sectional view through a cross link made pursuant to a modified form of the present invention.

Fig. 6 is a fragmentary, cross-sectional view taken on line VI—VI of Fig. 5.

Fig. 7 is a fragmentary, cross-sectional view taken on line VII—VII of Fig. 5.

Fig. 8 is a fragmentary, cross-sectional view similar to Fig. 5 through the tire traversing means of another form of the instant invention.

Fig. 9 is a cross-sectional view taken on line IX—IX of Fig. 8; and

Fig. 10 is a view similar to Fig. 7 showing still another embodiment of the present invention.

Figure 1:
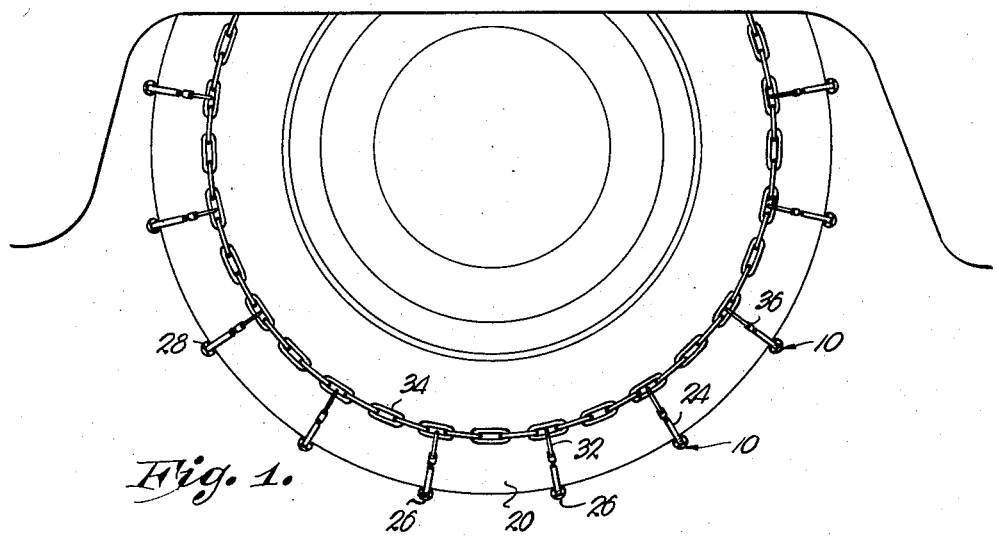
Figure 1 is an elevational view of an automotive wheel showing a tire chain mounted on the tire thereof embodying cross links made pursuant to one form of the present invention.

It is generally recognized that the use of conventional tire chains is objectionable because of excessive wear thereon occasioned by continuous slapping of the cross links thereof against hard roadbeds such as pavements, particularly after snow and ice have been removed.

Such objection is so predominant that there is a general reluctance to employ chains of any kind, even under hazardous conditions, resulting in traffic congestion and high accident rate. The difficulty is increased by the fact that snow and ice are normally removed rather promptly along thoroughfares and, while chains are needed on side streets and driveways, it is not desirable to use the same on the dry, clean pavements because of time wear and damage to the chains themselves.

Therefore, an exceptionally large number of attempts have heretofore been made to provide an anti-skid device capable of overcoming the aforementioned problems but, so far as I am aware, the devices heretofore proposed have not been successful, and for the most part, the conventional chain link is still being used.

Such problems are overcome through use of the traction grips chosen for illustration and in the form shown by Figs. 1-4, the same is broadly designated by the numeral 10. It consists of a substantially U-shaped device 12 presenting a bight or axle 14 and a pair of identical legs 16 and 18 which extend laterally from the axle 14 and, to the end that the cross link 10 conforms to the contour of tire 20, the legs 16 converge as the axle 14 is approached.

It is to be noted that the axle 14 is continuous and integral with the legs 16. Therefore, it is to be preferred that the device 12 be made from an oil-tempered, spring wire to provide for flexibility and resilience.

The legs 16 join with the axle 14 in arcuate zones of bend 22 which are provided with elements 24 that are substantially rigid and L-shaped. These elements 24 are in the nature of steel tubing in the embodiment shown in the drawing and threaded tightly on the legs 16, as well as on the axle 14 at zones 22. The zones of bend 22 prevent slippage of elements 24 and the latter serve principally as keepers to prevent lateral slippage upon application of side force during use.

A plurality of resilient lugs 26, as well as a number of relatively incompressible traction lugs 28 are mounted on the axle 14 between the two tubular elements 24. The traction lugs 26 are preferably in the nature of cylindrical, disc-like rollers journaled on the axle 14 and made from rubber or similar material that is capable of being compressed diametrically thereof between the tread of tire 20 and the roadbed.

Figures 3, 4:
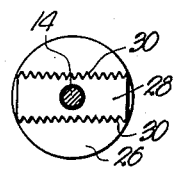
Fig. 3 is a detailed, cross-sectional view taken on line III—III of Fig. 2.
Fig. 4 is a detailed, cross-sectional view taken on line IV—IV of Fig. 2.

The lugs 28 on the other hand, are preferably metallic and appreciably thinner than the flexible rollers 26. While the lugs 28 may take any suitable form (preferably polygonal), those chosen for illustration are rectangular as seen in Fig. 4 and the width thereof is less than the normal incompressed diameter of the roller lugs 26. The length of the lugs 28 is however, substantially the same as the said normal diameter of the roller lugs 26.

It is important that the rollers 26 be journaled on the axle 14 as above mentioned, but the lugs 28 may be similarly journaled on the axle 14 as shown, or rigidly secured thereto as desired.

In the preferred form of the invention, the lugs 26 and 28 are alternately arranged on the axle 14 but good results may also be obtained by placing a number of lugs 26, as well as a number of lugs 28, in side-by-side relationship. Skid-resisting tread surfaces are provided on the lugs 28 through the provision of transverse ribs 30 on the longitudinal edges thereof.

The legs 16 terminate in loops 32 which may be utilized as a means of fastening the devices 10 to the tire 20. For example, the loops 32 engage the links of annular holding means such as chains 34 of conventional character. it being understood of course, that additional links may be employed between the chains 34 and the loops 32 if desired. Releasable clips 36 may be employed to hold the loops 32 closed when the inherent nature of the material from which device 12 is formed is such as to require a coupling member. In practice. it has been found that the free end of loop 32 will remain close to the main portion of leg 16 without the use of a clip.

It can now be appreciated that a tire chain provided with transverse traction grips 10 such as above described, provide better traction and longer wear in that the same will not be quickly destroyed by abrasion when operating on dry pavement or other hard road surfaces as has heretofore been true of conventional cross chains composed of steel links. The assembly will not wind itself into a tight and tensioned condition causing failure as is true of conventional structures. because the lugs 28 are free to pivot about the axis of axle 14 when power is applied to the wheel having the assembly thereon.

The provision of steel tubing 24 at zones of bend 22 strengthens frame 12 to permit flexing without breaking when legs 16 are spread due to a widening of the tire 20. Since tubing 24 is fixed. and further. since rubber lugs will expand laterally due to compression between the road surface and the tire 20 tight interengagement between all lugs 26 and 28 will occur at a time when a minimum amount of rotation thereof is desirable. In some instances pre-compression of the lug train may be desirable. If so. the tubing 24 is so positioned before bending to insure this relationship between the lugs 26 and 28.

When traction is applied in starting or stopping. the legs 16 travel through an arc. the axis of which is the horizontal axis of axle 14. Under such condition. tubing 24 strengths the zone of bend to prevent fatigue and failure at that juncture due to the necessity of overcoming friction between the lugs 26 and 28 and axle 14.

The normal distance between the free or looped ends of legs 16 is slightly greater than the width of the tire 20 to which the chain is applied. Thus, a "tensioning" of the annular chains 34 on each side of tire 20 is accomplished. This action is due to the resiliency of U-shaped device 12.

The rubber lugs 26 should extend beyond the edges of the lugs 28 in whole or in part so as to provide protection and to cushion the shock when the link 10 slaps against the pavement. This prevents noise and wear and at the same time provides the proper traction when the lugs 26 and 28 are compressed between the tire and the pavement. While the lugs 26 might well be equal in size and shape to that of the lugs 28 and thereby provide some protection, it is to be preferred that the lugs 26 compress to the width of the lugs 28, thereby causing the latter and particularly the ribbed edges 30 thereof, to not only grip the tread of tire 20, but the underlying roadbed.

In any event, the lugs 26 should preferably be round so as to rotate on the axle 14 and thereby wear uniformly. Lugs 26 tend to revolve slightly the moment they strike the pavement, thereby preventing excessive abrasion and damage to the lugs 26 themselves as well as furnishing protection to the metal lugs 28 without neutralizing this desired effect. Lugs 28 also rotate and wear is uniform on their longitudinal faces of contact.

In summary, some of the advantageous features of the invention above described, may be outlined as follows:

(1) "Road slap" is reduced because axle 14 remains straight and semi-rigid when free from confinement between road surface and tire tread. This is due in part to tensioning of chains 34 as above set down.

(2) Axle 14 will yield to irregularities in the roadbed and readily flex or twist in all directions without breakage.

(3) Axle 14 permits free rotation of lugs 26 (as well as lugs 28 if desired) not only while axle 14 remains stationary with respect to tire 20, but as the member 12 swings with respect to links 34, such swinging being unrestricted because of the way in which loops 32 receive the chain link 34.

(4) Under normal driving conditions the lugs 26 keep the lugs 28 from slapping against the roadbed, eliminating wear and tear and reducing noise.

(5) When the chain is in the operative position, the lugs 26 compress sufficiently to cause a gripping action between the lugs 28, tire 20, and the roadbed.

(6) When the lugs 26 are compressed, the traction elements 26 and 28 are all tightly forced together between the tubes 24, thereby operating as a unit and providing maximum traction for any emergency and preventing sidewise skidding.

(7) The alternating of resilient and rigid lugs protects the resilient lugs from excessive wear and dislodgment under strenuous use.

These and many other advantages have, therefore, been brought together in combination to meet a long-existing problem and it is seen that the demand for a tire chain constructed as above outlined, will be great because of a willingness to place the same in use whenever there is even the slightest need therefor, and to continue such use until the hazardous conditions have completely subsided.

In Figs. 5–7, a traction grip 100 is shown composed of a pair of substantially U-shaped devices 102 which may be identical with devices 12. presenting. therefore, a pair of tire-traversing means in the nature of axles 104 and 106 and connected with chain 108 in the manner above described.

Each axle 104 and 106 has a plurality of compressible roller lugs 110 journaled thereon and which may have the same physical characteristics as lugs 26 shown in Figs. 1–4. In the same manner, incompressible lugs 112 are similar to lugs 28 in that they are narrower than the expanded diameters of lugs 110. Lugs 112 are, however, appreciably longer than the normal diameters of lugs 110 and may alternate or be arranged in other desired manners with respect to lugs 110 in interconnecting relationship to axles 104 and 106. Here again, tubular elements 114 serve as keepers to maintain lugs 110 and 112 on axles 104 and 106 and lugs 112 are provided with anti-skid, longitudinal edges 116.

Only lugs 110 are permitted to rotate in the embodiment of Figs. 5–7, but when compressed between the tire and the roadbed, they are deformed to substantially the width of lugs 112 and serve to protect the latter in the same manner as hereinabove explained.

In Figs. 8 and 9, there is shown a modification wherein neither the compressible lugs 200 nor the incompressible lugs 202 is permitted to rotate. Lugs 202 are similar to lugs 112 and join a pair of axles 204 and 206 in the same manner. In this form however, lugs 200 are also rectangular and are mounted in interconnecting relationship to axles 204 and 206.

It is seen that lugs 200 are wider and longer than lugs 202, serving therefore, to reduce damage and wear to lugs 202. But, when compressed, lugs 200 are deformed to substantially the same width as the anti-skid, metallic lugs 202.

Figure 2:
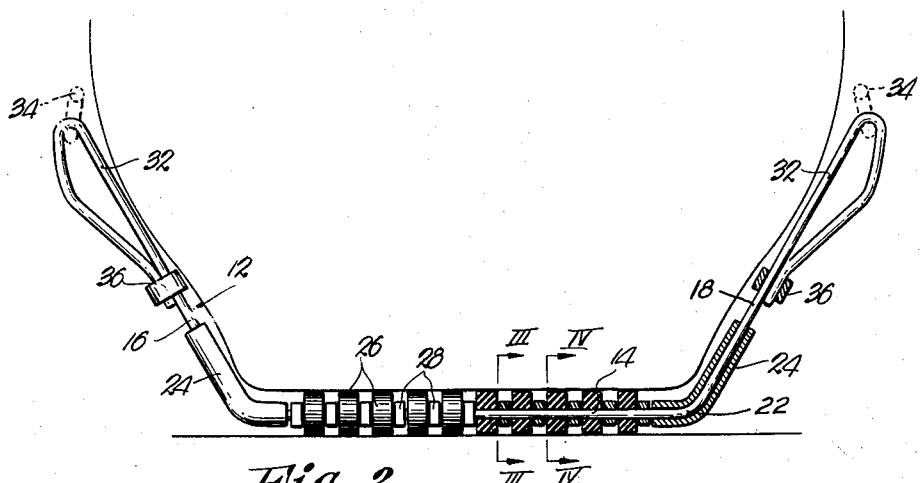
Fig. 2 is an enlarged view of one of the cross links of Fig. 1 partially in elevation and partially in section showing the same in operative position on a tire.

Lugs 300 and 302 as shown in Fig. 10 of the drawings, are identical with lugs 26 and 28 except only that openings 304 therein are large enough to permit rotation thereof on a pair of axles 306 and 308, it being understood that such axles traverse the tire and are joined with the side chains in a suitable manner such as by the means suggested in Figs. 2 and 5.

All of the advantages above outlined with respect to the embodiment of Figs. 1–4 apply equally to the forms of Figs. 5–7, 8–9 and 10, and need not be repeated.

Having thus described the invention what is claimed as new and desired to be secured by Letters Patent is:

1. In a traction device for a vehicle tire, a cross member provided with two sets of traction elements in series relationship therealong, one set comprising a plurality of incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being interspersed among the lugs, rendering the compressible elements and the lugs mutually protective of each other against undue wear and abuse.

2. In a traction device for a vehicle tire, an elongated cross member provided with two sets of initially separate traction elements having openings therethrough, said member extending through the openings whereby the elements are strung on the member in a continuous series throughout substantially the length of the member, one set comprising a plurality of incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being interspersed among the lugs, rendering the compressible elements and the lugs mutually protective of each other against undue wear and abuse.

3. In a traction device for a vehicle tire, a cross member provided with two sets of traction elements in series relationship therealong, one set comprising a plurality of incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being rotatable on the member and interspersed among the lugs, rendering the compressible elements and the lugs mutually protective of each other against undue wear and abuse.

4. In a traction device for a vehicle tire, an elongated cross member provided with two sets of initially separate traction elements having openings therethrough, said member extending through the openings whereby the elements are strung on the member in a continuous series throughout substantially the length of the member for rotation with respect thereto, one set comprising a plurality of incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being interspersed among the lugs, rendering the compressible elements and the lugs mutually protective of each other against undue wear and abuse.

5. In a traction device for a vehicle tire, an elongated cross member provided with two sets of initially separate traction elements having openings therethrough, said member extending through the openings whereby the elements are strung on the member in a continuous series throughout substantially the length of the member, one set comprising a plurality of elongated, polygonal, incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being circular and, the diameter of the compressible elements being greater than the length of the lugs and interspersed among the lugs, rendering the compressible elements and the lugs mutually protective of each other against undue wear and abuse.

6. In a traction device for a vehicle tire, a pair of cross members, each provided with two sets of traction elements in series relationship therealong, one set comprising a plurality of incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being interspersed among the lugs, rendering the compressible elements and the lugs mutually protective of each other against undue wear and abuse, the lugs interconnecting the members.

7. In a traction device for a vehicle tire, a pair of cross members provided with two sets of traction elements interconnecting the same in series relationship therealong, one set comprising a plurality of incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being interspersed among the lugs, rendering the compressible elements and the lugs mutually protective of each other against undue wear and abuse.

8. In a traction device for a vehicle tire, a pair of cross members provided with two sets of elongated, polygonal traction elements interconnecting the same in series relationship therealong, one set comprising a plurality of incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being interspersed among the lugs, rendering the compressible elements and the lugs mutually protective of each other against undue wear and abuse, the width and length of the lugs being less than the width and length of the compressible elements.

9. In a traction device for a vehicle tire, a substantially U-shaped cross member provided with two sets of traction elements in series relationship therealong, one set comprising a plurality of incompressible lugs, the other set engaging the tire when the device is mounted thereon and normally holding said lugs spaced from the tire, said other set being compressible whereby the lugs are clamped against the tire only when the member is disposed between the tire and a roadbed supporting the vehicle, the compressible elements being interspersed among the lugs, rendering the compressible elements and the lugs mutually protective of each other against undue wear and abuse, said member having a bight and a pair of legs, there being zones of bend integrally joining the legs and the bight; and a tube on the member at each of said zones respectively, the elements being on said bight between the tubes.

References Cited in the file of this patent

UNITED STATES PATENTS

| | | |
|---|---|---|
| 1,533,679 | Webster | Apr. 14, 1925 |
| 2,161,343 | Fritts | June 6, 1939 |
| 2,414,067 | Sentivany | Jan. 17, 1947 |
| 2,625,193 | La Rocca | Jan. 13, 1953 |
| 2,679,882 | Rich | June 1, 1954 |
| 2,693,838 | Dandurand | Nov. 9, 1954 |
| 2,740,449 | Erving | Apr. 3, 1956 |